United States Patent [19]

Bernitz et al.

[11] Patent Number: 5,680,015

[45] Date of Patent: Oct. 21, 1997

[54] METHOD TO OPERATE A DISCHARGE LAMP, AND CIRCUIT ARRANGEMENT FOR OPERATION OF THE DISCHARGE LAMP

[75] Inventors: Franz Bernitz, Unterhaching; Andreas Huber, Maisach; Hendrik Kornatz, Berlin; Peter Niedermeier, Munich, all of Germany

[73] Assignee: Patent-Treuhand-Gesellschaft F. Elektrische Gluehlampen mbH, Munich, Germany

[21] Appl. No.: 539,882

[22] Filed: Oct. 6, 1995

[30] Foreign Application Priority Data

Oct. 19, 1994 [DE] Germany .................. 44 37 453.4

[51] Int. Cl.$^6$ .................................. H05B 37/02
[52] U.S. Cl. ..................... 315/291; 315/307; 315/308
[58] Field of Search ............................ 315/307, 224, 315/DIG. 4, DIG. 5, 291, 308

[56] References Cited

U.S. PATENT DOCUMENTS

| | | | |
|---|---|---|---|
| 4,792,887 | 12/1988 | Bernitz et al. | 363/89 |
| 4,914,356 | 4/1990 | Cockram | 315/307 |
| 4,952,849 | 8/1990 | Fellows et al. | 315/307 |
| 5,198,728 | 3/1993 | Bernitz et al. | 315/307 |
| 5,233,273 | 8/1993 | Waki et al. | 315/224 |
| 5,463,287 | 10/1995 | Kurihara et al. | 315/208 |
| 5,569,984 | 10/1996 | Holtslag | 315/307 |

FOREIGN PATENT DOCUMENTS

| | | |
|---|---|---|
| 0 386 990 | 9/1990 | European Pat. Off. . |
| 0 482 705 | 4/1992 | European Pat. Off. . |
| 0 541 909 A1 | 5/1993 | European Pat. Off. . |

OTHER PUBLICATIONS

"Technisch–wiessenschaftliche Abhandlungen der Osram–Gesellschaft" (Technological–Scientific Publication by the Osram Company), published by Springer Publishers, Berlin Heidelberg New York Tokyo, 1986, vol. 12, pp. 374–407; no month.

Data Sheet of ST6260/65 Microprocessor, published by SGS–Thomson Microelectronics, Dec. 1993.

Publication by International Rectifier Company, Data Sheet 6.028, Jan. 13, 1994, "Half–Bridge Power MOSFET/IGBT Gate Driver IR2111".

*Primary Examiner*—Robert Pascal
*Assistant Examiner*—David Vu
*Attorney, Agent, or Firm*—Frishauf, Holtz, Goodman, Langer & Chick, P.C.

[57] ABSTRACT

To operate a discharge lamp, and more particularly a low-power high-pressure discharge lamp, only in quiet or stable lamp operation, a microprocessor (MC) is provided which establishes a test phase of limited time duration during which the frequency of operation of the lamp is varied by frequency modulation within a predetermined range. Lamp operation is monitored, for example by deriving a test voltage across a coupling capacitor (C6) receiving lamp current. If the monitored voltage, which is representative of lamp operation, shows that the lamp operates quietly and stably, the then pertaining frequency is stored by the microprocessor and, after the test phase is finished, the lamp is operated within a frequency window formed by the largest number of contiguous modulation frequencies which are suitable for, or result in, stable lamp operation. The test phase is carried out repetitively, at least upon each energization of the lamp, so that different operating characteristics of the lamp (e.g. due to changes in temperature, aging, or the like) are compensated.

20 Claims, 3 Drawing Sheets

FIG. 3 ated with a-c power which is frequency-modulated. The
METHOD TO OPERATE A DISCHARGE LAMP, AND CIRCUIT ARRANGEMENT FOR OPERATION OF THE DISCHARGE LAMP Reference to related patents, assigned to the assignee of the present application, the disclosures of which are hereby incorporated by reference:
U.S. Pat. No. 5,198,728, Bernitz et al.
U.S. Pat. No. 4,792,887, Bernitz et al.
Reference to related disclosure, patented to the assignee of the present application:
European 0 541 909 A1, Zuchtriegel et al.
Reference to related publications:
"Technisch-wissenschaftliche Abhandlungen der Osram-Gesellschaft" ("Technological-Scientific Publication by the Osram Company"), published by Springer Publishers, Berlin Heidelberg New York Tokyo, 1986, Vol. 12, pages 374–407;
"Schaltnetzteile" by Hirschmann and Hauenstein ("Circuit Components), published by Siemens Aktiengesellschaft, page 42 and pages 62–64;
Data Sheet of ST6260/65 Microprocessor, published by SGS-THOMSON MICROELECTRONICS, December 1993;
Publication by International Rectifier Company, Data Sheet 6.028, Jan. 13, 1994, "Half-Bridge Power MOSFET/IGBT Gate Driver IR2111.

FIELD OF THE INVENTION

The present invention relates to a method to operate a discharge lamp, and more particularly a high-pressure discharge lamp, and to a circuit to operate the discharge lamp, and which operates according to the method.

BACKGROUND

An operating system to operate halogen metal vapor discharge lamps of low power is described in Vol. 12 of the "Technisch-wissenschaftliche Abhandlungen der Osram-Gesellschaft" ("Technological-Scientific Publication by the Osram Company"), published by Springer Publishers, Berlin Heidelberg New York Tokyo, 1986, pages 395–411. This volume contains a paper by E. Statnic "Relating to High-Frequency Operation of Halogen Metal Vapor Lamps of Small Power". In accordance with this publication, high-pressure discharge lamps, particularly halogen metal vapor high-pressure discharge lamps of low power, are supplied with frequency modulated alternating current in an intermediate frequency range between about 10 kHz and 500 kHz, and having a modulation frequency excursion of between about ±10–15% of operating frequency. Use of operating frequency within the kHz range permits constructing electronic accessory or ballast circuits in compact form, and with low power losses. This increases the possibility of using small high-pressure discharge lamps in fixtures or luminaires which previously were restricted to use with different types of lamps, for example halogen incandescent lamps.

It has been found that high-pressure discharge lamps are subject to unstable operating states when they are operated with higher a-c frequencies. These unstable states apparently arise by acoustic resonance, that is, acoustic standing waves within the discharge medium in the discharge vessel. Particularly strong acoustic resonances occur when the frequency of the a-c power coincides with one of the resonance frequencies of the standing acoustic waves. The position of the resonance frequency depends on the geometry of the discharge vessel and on the acoustic speed within the discharge vessel. To prevent flicker, or even extinction of the discharge arc within the discharge vessel due to acoustic resonances, high-pressure discharge lamps are customarily operated with a-c power which is frequency-modulated. The resonant frequencies of the acoustic resonances are passed so rapidly during frequency modulation that acoustic resonances can form only to a limited extent. Processes relating to aging, as well as tolerances in manufacture, result in specific characteristics for each lamp, so that prior art electronic ballasts or accessory apparatus can react only to a limited extent to meet the desired operating parameters.

THE INVENTION

It is an object to provide an improved method to operate a discharge lamp with an electronic ballast, which provides for stable, flicker-free operation; and to a circuit to operate a discharge lamp which, in operation, will be free of flicker and provides operating energy in accordance with operating parameters which are optimally matched to the specific lamp at the specific time in its operating life.

Briefly, the discharge lamp receives energy from a power supply unit which supplies the lamp with alternating current energy. The supplied a-c energy is frequency-modulated. The frequency excursion, due to the modulation, varies within a predetermined frequency modulation range.

In accordance with a feature of the invention, a test phase of limited time duration is established to determine, during the test phase, those a-c frequencies which, within the predetermined frequency modulation range, are suitable for optimum operation, and result in stable lamp operation. After termination of the test phase, the lamp is operated only with those a-c frequencies which are suitable for, or result in, that stable frequency-modulated power supply lamp operation.

The frequency-modulated a-c current supplied by the accessory apparatus varies within the predetermined frequency range and, automatically, determines those frequencies which result in, or are most suitable for, stable operation. Thereafter, only those so determined frequencies will be used to operate the lamp.

Upon energizing the lamp for starting, the lamp ignites and, as soon as it has fired, the accessory circuit provides, within a predetermined frequency range, a predetermined number of discrete frequencies to test for their suitability. Within a predetermined time interval, the lamp current frequency is changed, in steps, and a parameter characteristic for lamp operation is monitored to determine if the lamp operates stably or not. This forms a test phase. After termination of the test phase, the discharge lamp is operated within a frequency window which only provides those a-c frequencies which are suitable for stable lamp operation.

In accordance with a preferred feature of the invention, the frequency window suitable for stable operation does not include all a-c frequencies found suitable during the test phase but, rather, the window is formed by those suitable a-c frequencies which fall within the largest continuous range of frequencies resulting in stable lamp operation. The test phase is initiated, preferably each time the lamp is energized, and can be carried out also during continuous lamp operation.

The method ensures flicker-free operation of the lamp even if the characteristics of the lamp change due to aging within its normal life span.

In accordance with a feature of the invention, the circuit uses a microcontroller, and most preferably a programmable microprocessor which, automatically, carries out the test phase to determine those a-c frequencies which result in stable lamp operation. Those frequencies, once determined, are stored. During the test phase, the microprocessor monitors the characteristic electrical values of parameters which result in stable or respectively, in unstable lamp operation. It so controls the circuit arrangement that the discharge lamp will operate, after termination of the test phase, only within a frequency window which contains only those frequencies which ensure stable operation.

In accordance with a feature of the invention, the circuit includes an inverter, especially an externally controlled half-bridge inverter, which has an LC output circuit forming a resonant circuit, in which the discharge lamp is connected, or integrated. The programmable microprocessor controls the inverter, and further monitors, by means of a sensor, the voltage drop on a coupling capacitor which is integrated in the resonant circuit, and through which the lamp current passes. Instabilities of the discharge arc have immediate effects on the lamp current, and hence on the voltage across the coupling capacitor. The voltage drop at the coupling capacitor, and particularly lower frequency voltage drop components provide an indication for stable, or unstable, lamp operation, respectively. The switching frequency of the half-bridge rectifier, and hence the frequency of the a-c flowing through the discharge lamp, is controlled by the microprocessor by a pulse width modulation signal.

During the test phase, the microprocessor controls the half-bridge rectifier to generate in the LC output circuit discrete a-c frequencies within a predetermined frequency interval, and then to determine and to store those a-c frequencies which result in flicker-free operation of the lamp. When the test phase terminates, the programmable microprocessor determines a frequency window based on the tested a-c frequencies. This frequency window is then used after termination of the test phase to operate the lamp. The frequency window, preferably, includes the largest continuous range of a-c frequencies which were determined to be suitable for stable lamp operation.

The circuit in accordance with the present invention permits optimum matching of the operating parameters of the accessory or electronic ballast circuit to the discharge lamp in accordance with its then pertaining electrical parameters, as will appear in more detail below. The programmable microprocessor, operating digitally, ensures flicker-free lamp operation. The microprocessor, or microcontroller can accept other control tasks as well, for example those which in customary prior art electronic ballast or accessory circuits were carried out by analog technology.

DRAWINGS

The drawings illustrate circuits in accordance with the present invention, to operate a discharge lamp in accordance with the present invention.

DETAILED DESCRIPTION

Figure 1:
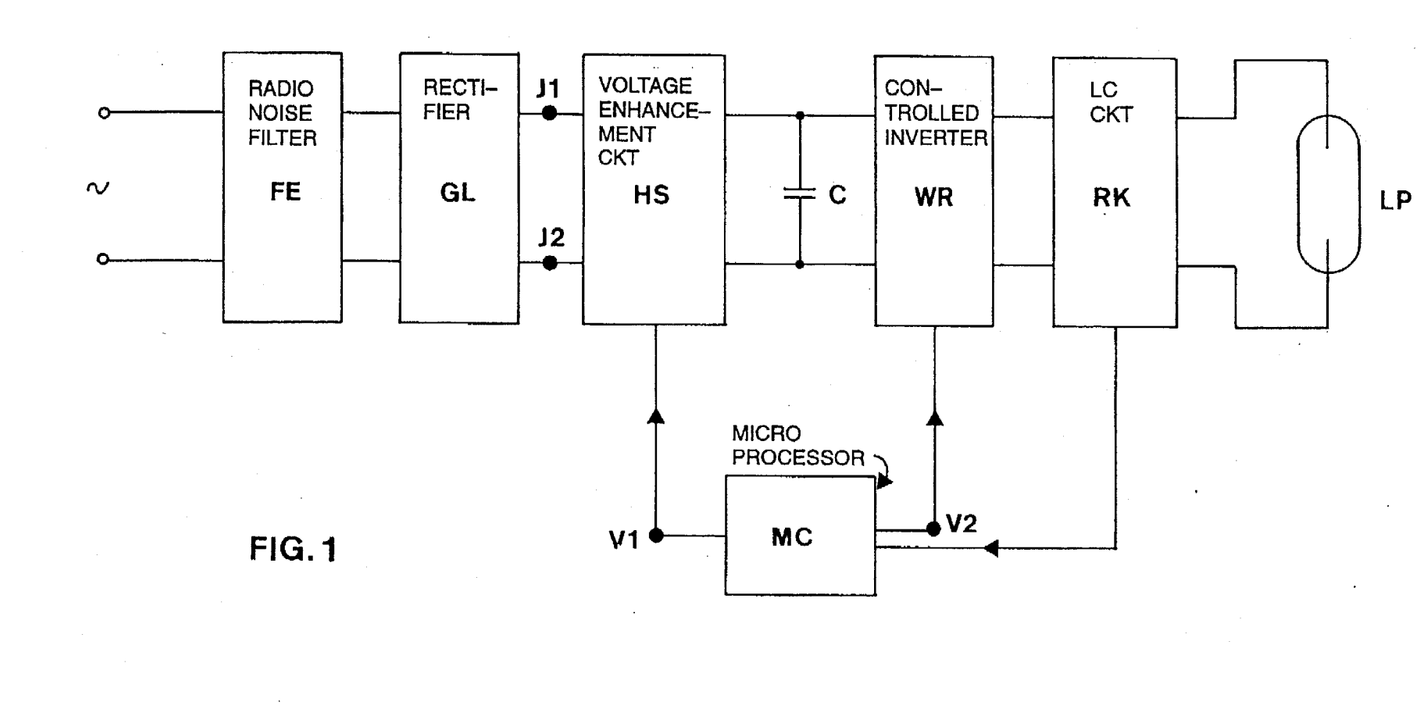
FIG. 1 is a basic schematic diagram of the circuit in accordance with the present invention.

The circuit in accordance with the present invention is shown in FIG. 1 in highly schematic block diagram form. The circuit is connected to an a-c power supply and, starting from the power supply, includes a radio noise filter FE, a rectifier GL, a voltage enhancement or boost converter circuit HS, an intermediate circuit coupling capacitor C, an externally controlled inverter WR, which preferably is a half-bridge inverter, an LC output circuit RK, and a microprocessor MC. This circuit provides output power to a discharge lamp LP, especially a high-pressure discharge lamp.

The method in accordance with the present invention will be described in connection with FIG. 1. The voltage enhancement circuit HS provides d-c power from the radio noise filter FE and the rectifier GL. The d-c voltage on capacitor C is high and has low harmonic content. The circuit, further, ensures that the energy from the network will be essentially sinusoidal.

The controlled inverter WR receives supply voltage from the capacitor C. The inverter WR supplies high-frequency a-c to the LC output circuit RK, which is formed as a resonant circuit, to which the lamp LP is connected. The microprocessor or microcontroller MC is connected to the resonant circuit RK and monitors the lamp current. Based on the lamp current, as sensed and monitored, the switching frequency of the inverter WR is controlled by the microprocessor MC. This, then, controls the frequency of the lamp current. Another terminal V1 from the microprocessor MC is connected to the voltage doubler or voltage enhancement circuit HS to turn OFF the circuit HS, and thus turn OFF the circuit arrangement formed by the inverter, the LC circuit, the lamp, and, if desired, also of the microprocessor itself.

After turning the circuit ON, the microprocessor or microcontroller MC receives power and first controls the half-bridge inverter WR, connected to the resonant circuit RK, to provide frequency-modulated a-c to the resonant circuit RK. Initially, the frequency of the a-c voltage supplied by the inverter WR is varied by the microcontroller MC in the frequency interval of about 20 kHz to 25 kHz in 16 discrete steps. Thereafter, the a-c voltage supplied by the controlled inverter WR is modulated upwardly, that is frequency-increased, and modulated downwardly, that is frequency-decreased, within a half-wave of the power supply voltage. This up-and-down modulation of the output of the inverter WR occurs within about 10 ms. This operating state will be referred to as "normal operation" below.

After the discharge lamp LP has fired, and a lamp starting phase has ended, the microcontroller MC, automatically, initiates a test phase. In the course of the test phase, the inverter WR holds each one of the above referred to 16 a-c frequencies for a longer period of time, that is, for about 5 seconds each time. That means that for 5 seconds, each time, the discharge lamp LP is operated with one of the 16 a-c frequencies. The microcontroller MC monitors the lamp current through a sensing circuit SC (FIG. 3) during all these times and stores whether the particular a-c frequency results in stable, or unstable, lamp operation. The inverter returns to "normal operation" between each change of the test frequency, for about 5 seconds.

At the end of the test phase, just described, the microprocessor MC determines from the many a-c frequencies those which result in stable lamp operation to provide a new frequency window for frequency modulation of the inverter output voltage or, respectively, of the lamp alternating current. This new frequency window, in accordance with a preferred feature of the invention, is formed by the largest continuous range of test frequencies which result in stable lamp operation. The microcontroller then controls the inverter WR to supply operating power to the lamp LP, after termination of the test phase, only at those frequencies which are within the so determined frequency window.

Complete modulation, that is, increase and decrease of the a-c power delivered by the inverter WR, or of the lamp current, respectively, will be carried out also within the new frequency window within a network half-wave, that is, within 10 ms. In other words, after termination of the test phase, a "normal operation" will result which only includes those frequencies which were determined to provide stable lamp operation, that is, those test frequencies which are within the newly determined frequency window.

The microprocessor controlling the operating method in accordance with the present invention is suitably a programmable microcontroller, for example of the type ST6265, supplied by SGS-THOMSON MICROELECTRONICS, forming part of the overall circuit arrangement. The characteristics of this microprocessor are shown in Table I. The entire description of the microprocessor ST6265 is a 500+ page book; pertinent data sheets accompany this application. The course and evaluation of the test phase are controlled by the assembler program within the microcontroller.

Figure 2:
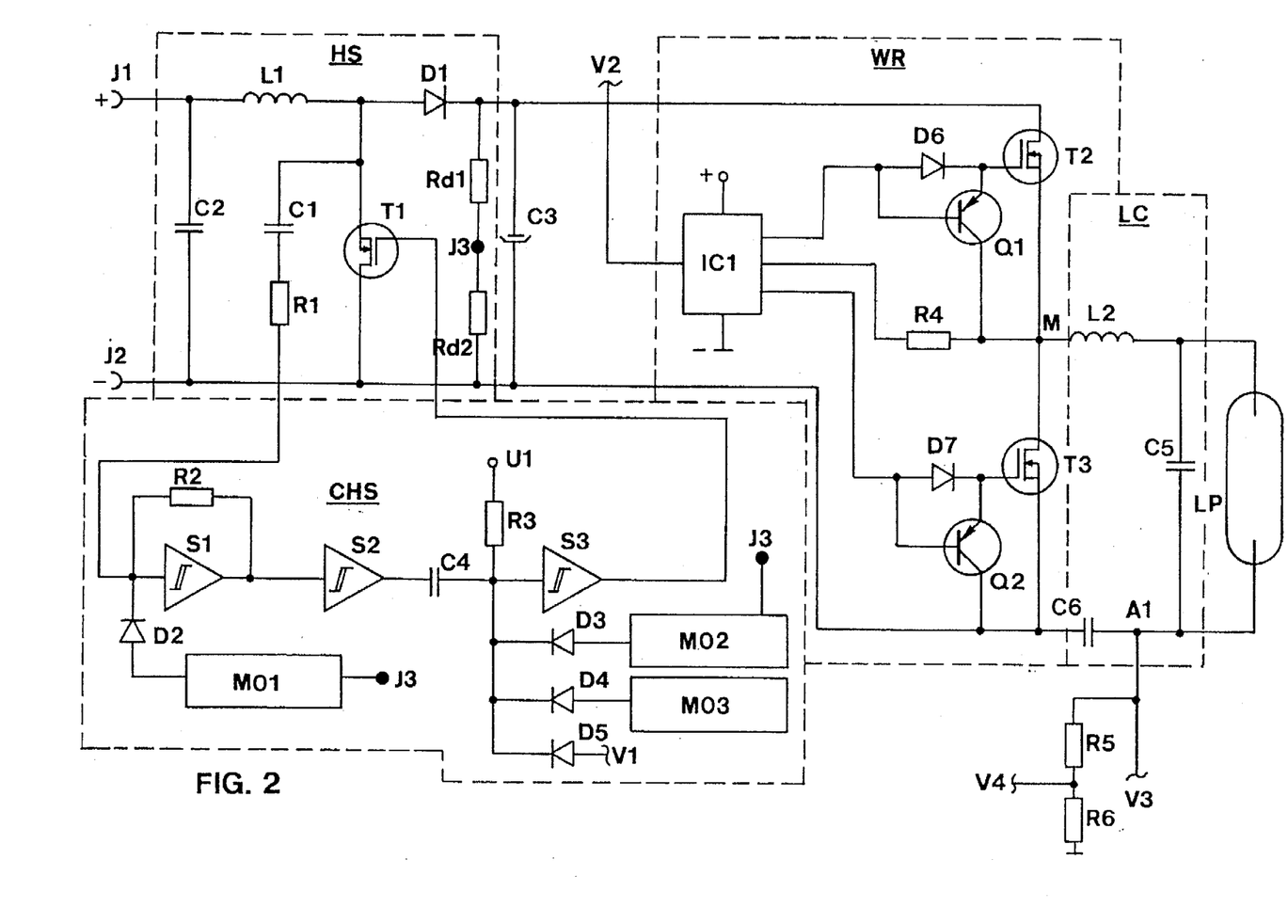
FIG. 2 illustrates a portion, in highly schematic form, of the circuit of the present invention.
Figure 3:
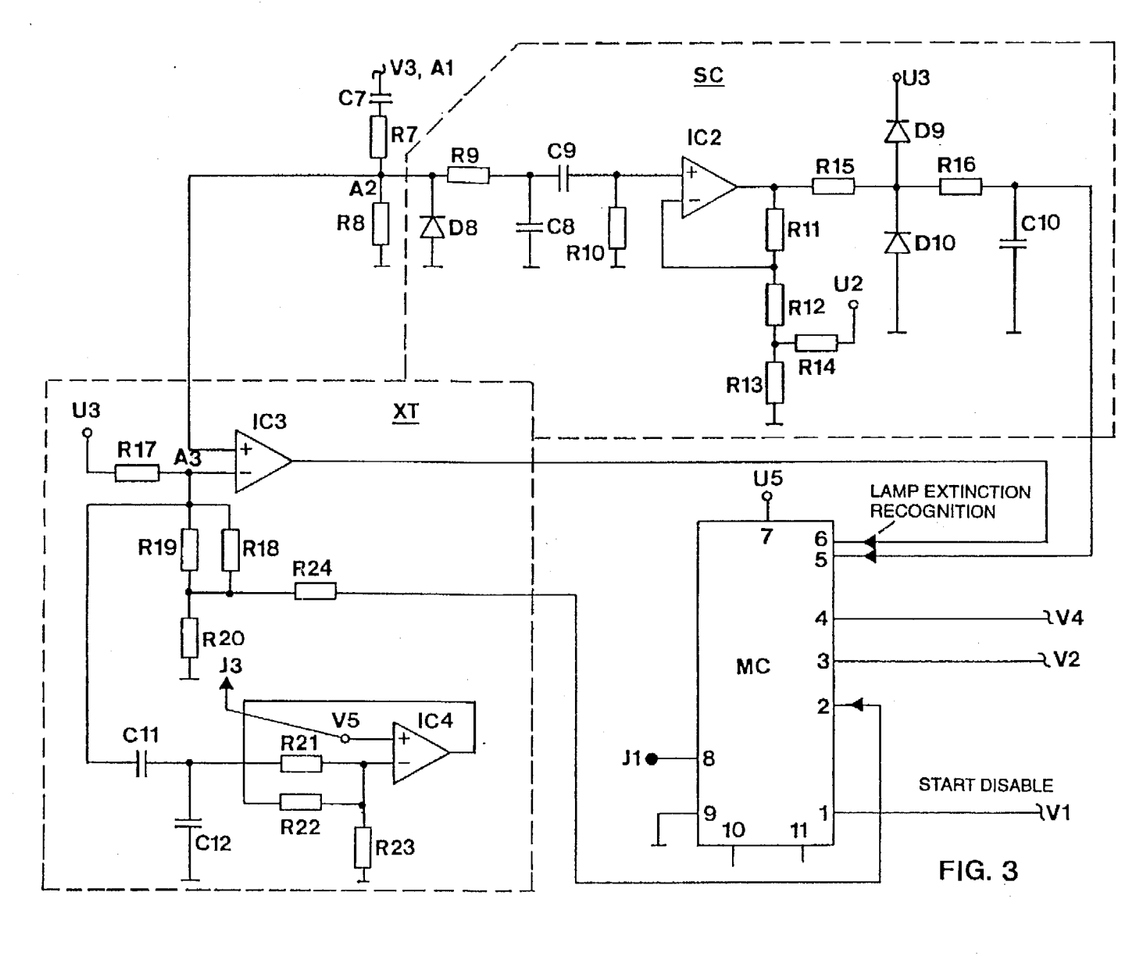
FIG. 3 illustrates another portion, in highly schematic form, of the circuit in accordance with the present invention.

Referring now to FIGS. 2 and 3, which illustrate the circuit diagram in detail, and its connection to the ST6265 microprocessor, illustrating a preferred embodiment.

The voltage enhancement or voltage doubler circuit HS is formed by a field effect transistor (FET) T1, inductance L1, diode D1, the RC element formed by resistor R1, capacitor C1, an input capacitor C2, and a control circuit CHS. The output of the voltage enhancement circuit is formed by the intermediate capacitor C3, corresponding to capacitor C of FIG. 1.

The voltage enhancement circuit is supplied with d-c voltage through the radio noise filter FE and rectifier GL (FIG. 1) and rectified current is received over junctions J1, J2, with the polarity shown. The rectifier GL, preferably, is a bridge rectifier. The radio noise suppression filter FE and the rectifier circuit are well known and therefore not illustrated in detail. EP 0 541 909, Zuchtriegel, describes one type of radio noise filter which is suitable.

The control circuit CHS for the voltage enhancement circuit includes a voltage limiting unit MO1, a voltage regulating unit MO2, a power control unit MO3 and a connection V1 to the port 1 of the microprocessor ST6265. The connection V1 is protected by a diode D5. The diodes D2, D3, D4, D5 form an OR-circuit; Schmitt triggers S1, S2, S3, and coupling resistors and capacitors R2, C4, R3, and a reference voltage source U1 form further elements of the control circuit CHS for the voltage enhancement circuit HS. For a detailed description, reference is made to U.S. Pat. No. 4,792,887, Bernitz et al., the disclosure of which is incorporated by reference. The control units MO1, MO2, MO3 are also well known in the art, and do not need any specific description. A power control unit MO3, is described, for example, in U.S. Pat. No. 5,198,728, Bernitz et al., the disclosure of which is incorporated by reference.

The voltage control unit MO2 is usually formed by a PI controller, in which the control value is derived from a voltage divider formed by two resistors Rd1, Rd2 connected in parallel to the capacitor C3. The voltage value is obtained at the common junction J3 between the two resistors, which junction is connected to the control unit MO2, as shown. The voltage limiting unit MO1 may be formed by an operational amplifier connected as a comparator, which monitors the voltage drop across the voltage divider Rd1, Rd2 connected in parallel to capacitor C3 and can receive an input, for example from the junction J3.

The intermediate circuit capacitor C3, which is the circuit component of the schematically shown capacitor C (FIG. 1), is connected in parallel to the input of the half-bridge inverter WR. Capacitor C3 provides the supply voltage for the half-bridge inverter which, essentially, has two FETs T2, T3 connected in the half-bridge, and an integrated circuit unit IC1 which is connected over junction V2 with the auto reload—timer output 3 of the microprocessor MC and, in turn, controls the FETs T2, T3. The half-bridge inverter further has two bi-polar transistors Q1, Q2, two diodes D6, D7, which are, respectively, integrated in the gate control of the FETs T2, T3. The bi-polar transistors Q1, Q2 merely improve the switching behavior of the FETs T2, T3.

The center tap M of the half-bridge inverter is connected to the LC output circuit, formed as a resonant circuit. The resonant circuit LC has a resonance inductance L2, a resonance capacitor C5 and a coupling capacitor C6; circuit LC is connected to the high-pressure discharge lamp LP, which is connected in parallel to the resonance capacitor C5. The center junction M is connected over resistor R4 with the IC unit IC1. A junction A1 is formed between the coupling capacitor C6 and a voltage divider R5, R6 which is grounded, and one electrode of the lamp LP, respectively. The tap point of the voltage divider R5, R6 is connected over junction V4 to an input 4 of the microprocessor MC. The junction A1 is connected over terminal V3 with a sensor unit or circuit SC, which will be described in detail in connection with FIG. 3. The sensor unit is used to sense the low-frequency variations of the lamp current. These variations provide a sensed signal, or an indication for unsettled, or turbulent or disturbed operation of the arc within lamp LP.

Referring now to FIG. 3:

The sensor unit includes a capacitor C7, coupled to terminal V3 (FIG. 2). The capacitor C7 is connected to a voltage divider R7, R8, in which resistor R8 is connected to ground, or chassis. The junction A2 between resistors R7, R8 is connected to a rapid-acting rectifier diode D8 and a band-pass filter formed by capacitors C8, C9 and resistors R9, R10. The filter is connected to an amplifier formed by operational amplifier IC2, the voltage divider resistors R11, R12, R13, R14 and a voltage supply or reference source U2. Resistors R15, diodes D9, D10 and resistor R16 form a voltage limiting circuit. Diodes D9, D10 are clamped between a reference voltage source U3 and ground or chassis. A noise filter capacitor C10, which is also grounded, forms the output of the amplifier of the sensor unit, which is connected to the input 5 of the microprocessor MC.

In accordance with a feature of the invention, a circuit XT which recognizes extinction of the lamp is provided, which is connected to the junction A2 between the voltage divider resistors R7, R8. This rapidly reacting lamp-extinction recognition or monitoring circuit unit XT is needed in order to maintain lamp current if the lamp arc should be so unquiet or disturbed that the lamp might extinguish within a few milliseconds. The lamp extinction recognition unit XT has a rapidly reacting comparator circuit, and a reference voltage source. The essential components are an operational amplifier IC3, connected as a comparator, the direct input of which is connected to the junction A2 of the voltage divider R7, R8. The inverting input is connected over resistors R18, R24 to the output 2 of the microprocessor MC. Additionally, the junction A3, connected to the inverting input of operational amplifier IC3, is connected over a capacitor C11 with an operational amplifier IC4, resistors R21, R22, R23 and capacitor C12. The operational amplifier IC4 and the associated resistors R21, R22, R23 and capacitor C12 form an amplifier unit coupled to the junction A3. The junction A3 further is connected over resistor R17 of the voltage divider R17, R19, R20 with, respectively, the positive terminal of an auxiliary voltage source U3, and ground or chassis over resistors R19, R20. The direct input of operational amplifier IC4 is connected to the junction V5 which, in turn, is connected to the junction J3 of the voltage divider Rd1, Rd2 and, then, to the positive terminal of the capacitor C3. A separate voltage divider may be provided to decouple the voltage divider connected to the control circuit CHS for the voltage enhancement circuit and to the circuit of the sensing unit.

Microprocessor or microcontroller MC is only schematically shown in FIG. 3, and only those terminals necessary for an understanding of the present invention are shown. Terminals 7 and 9 are voltage supply sources for the microprocessor; the NMI input 8 of the microprocessor has a synchronization signal derived from the power supply network which, for a 60 Hz power supply, provides a 120 Hz synchronization signal, and coupled, by any suitable and well-known circuit to the output of the bridge rectifier GL, for example to the junction J1, which also forms the positive terminal of capacitor C2 (FIG. 2). The oscillator connections 10, 11 of the microprocessor MC are connected to a clock source which determines the clock frequency of the microprocessor MC. Data for dimensioning of the electronic components of the illustrative example of FIGS. 2 and 3 are shown in Table II. The circuit of the illustrative example is designed to operate a 70 W high-pressure discharge lamp.

Operation:

Upon energization of the circuit, the input of the voltage enhancement circuit HS, that is, capacitor C2 will have a voltage of about 230 V, derived for example from a bridge rectifier GL. The voltage at the intermediate capacitor C3, that is, the output voltage of the voltage enhancement circuit HS, will depend on the duty cycle, that is, the connection-disconnection time instants, as well as the OFF time of the FET T1.

The RC circuit R1, C1 (FIG. 2) detects the null or zero cross-over of the current through the inductance L1 to determine the connection instant. Voltage changes on capacitor C1 result in an input signal to Schmitt trigger S1 which is LOW. Consequently, the output of Schmitt trigger S1, forming the input of Schmitt trigger S2, will be a HIGH signal which is again inverted by Schmitt trigger S2 into an LOW signal, so that, after inversion by Schmitt trigger S3, the gate of the transistor T1 will have a HIGH signal, which turns the transistor T1 ON. The turn-OFF instant of the transistor will be determined by the charging time of the capacitor C4. When capacitor C4 has a HIGH voltage, the output of Schmitt trigger S3 will provide a LOW signal which turns transistor T1 OFF, that is, the switching path becomes high resistive. The turn-OFF time instant can be influenced by the control units MO1, MO2, MO3. The OFF time period, however, depends on the demagnetization current of the inductance L1. Voltage enhancement circuits of this type are well known, and a description can be found, for example, on page 42 of the referenced book "Schaltnetzteile" ("Circuit Components") by Hirschmann and Hauenstein, published by Siemens AG.

Voltage limiting unit MO1 monitors the output voltage at the intermediate capacitor C3 and, when the voltage exceeds a predetermined level, for example about 460 V, turns the voltage circuit OFF. During the run-on phase of the high-pressure discharge lamp, voltage control unit MO2 controls the output voltage of the voltage enhancement circuit HS at the intermediate capacitor C3 to a value of about 440 V. When the run-on or starting phase of the lamp has terminated, the power control unit MO3 controls the voltage enhancement circuit HS, so that the power acceptance of the lamp will be about 70 W.

The voltage at the intermediate circuit capacitor C3, which is available after the circuit is connected to a power supply, will be about 440 V. This is the supply voltage for the half-bridge inverter WR. Resonance capacitor C5 provides the necessary ignition voltage to fire the higher-pressure discharge lamp LP by resonant voltage enhancement. The microprocessor MC adjusts the switching frequency of the half-bridge inverter over its auto reload—timer output 3 and the IC unit IC1 by means of a pulse width modulation (PWM) signal, resonant to a harmonic of the resonant frequency of the resonant circuit. The ignition phase has a duration of about 300 ms. If, in that time, the lamp will not fire, the ignition phase is repeated after about 5 seconds. Repeated tries to fire the lamp will be carried out and, if the lamp has not fired after about 10 minutes, the output V1 of microprocessor MC disables the circuit. The timing intervals are determined by the assembler program installed in the microcontroller MC.

Let it be assumed that the lamps is operative, and has fired. The high-pressure discharge lamp LP then will be in the start-up phase, during which the fill components within the discharge vessel of the lamp vaporize and participate on the gas discharge. During the run-on phase, the high-pressure discharge lamp LP receives frequency modulated alternating current from the half-bridge inverter WR, at a frequency between about 20 kHz to 25 kHz, varying in 16 discrete steps. The complete modulation of the a-c frequency, increasingly or decreasingly, occurs within a power network half-wave time, that is, within 8.33 ms, for a 60 Hz power supply, or 10 ms for a 50 Hz power supply, as described in connection with the term "normal operation". The 16 frequency steps are determined by the assembler program of the microcontroller. The NMI input 8 of the microcontroller receives the network power synchronization signal from ripple at junction J1, and ensures complete modulation in increasing and decreasing direction of the a-c frequency within the power supply half wave. The number of the possible frequency steps for the frequency modulation is only limited by the clock frequency of the microprocessor. The frequency of the lamp current is determined by the switching frequency of the half-bridge transistors T2, T3 which, in turn, is determined by the pulse width modulation signal derived from the IC unit IC1. The unit IC1, in turn, is controlled by the pulse width modulation signal generated by the microcontroller. The operation of a half-bridge rectifier and control of the frequency thereof by means of pulse width modulation is well known. The referenced book "Schaltnetzteile" ("Switching Components") by Hirschmann and. Hauenstein, published by Siemens AG, pages 62–64, provides an illustration.

The pulse width modulation signal for the half-bridge inverter is generated at the auto reload timer, which is a component of the microprocessor MC. The auto reload timer has an 8-bit upward counter, a 7-bit predivider, and a clock multiplexer. To generate a continuous PWM signal at the auto reload timer output 3 of the microprocessor, a preloading value is established at each counter overrun. This is obtained by a logic which loads the correspondent value from the reload register into the counter. The frequency of the auto reload counter is determined by an auto reload status control register via a clock signal and a predivider. A reload/capture register stores the preloaded count value. At that count value, the auto reload timer output 3 of the microcontroller MC is set to HIGH. A compare register receives the compare value. When the compare value is reached, the auto reload timer output 3 of the microprocessor MC changes to LOW. That means that during the time when the auto reload counter counts up from the preload value to the compare value, the auto reload timer output 3 of the microprocessor MC provides a HIGH signal. Further, during the up-counting from the compare value to the maximum count value, resulting in a counting overflow of the counter, a LOW signal is provided by the auto reload timer output 3 of the microprocessor MC to the IC unit IC1 of the half-bridge rectifier. When the auto reload counter reaches the maximum count value, it is reset to the preloading or precharging value. The preload and compare values of the auto reload timer can be controlled by the assembler program of the microcontroller MC and, in that way, permit control of the time duration of the HIGH and LOW signals at the auto reload timer output 3 of the microprocessor MC, and hence the switching frequency of the half-bridge inverter WR.

In accordance with a feature of the invention, the microprocessor MC, under program control, starts the above-described "test phase" when the run-on or run-up phase of the lamp is finished, that is, after all the fill components within the discharge vessel participate in the arc discharge.

In accordance with a feature of the invention, the auto reload timer output 3 of the microprocessor MC, provides, as described above, the 16 test or modulation frequencies, respectively, successively, for 5 seconds each, and, at the same time, monitors lamp current. Upon change between two test frequencies, the circuit reverts for about 5 seconds to the above-described "normal operation". During the test phase, the sensor unit (FIG. 3) detects the voltage drop on the coupling capacitor C6 at junction A1. The sensing unit SC is connected over junction V3 and junction A1 to the lamp, and further to the input 5 of the microprocessor MC. The voltage drop across the coupling capacitor C6 very sensitively reacts to variations of lamp current.

Recognition of lamp extinction, and interrelationship with microprocessor MC:

The capacitor C7, directly connected to the junctions V3 and A1 (FIG. 3), filters the direct voltage portion from the sensing signal, so that junction A2 will have a pure alternating current signal thereon, the frequency of which is the same as that of the lamp current. This alternating voltage signal has the same variations as the lamp current. In addition, it has a 120 Hz harmonic (100 Hz for 50 Hz power supply), derived from the network power supply and rectification thereof, and transferred via the voltage enhancement circuit and the inverter circuit WR to the coupling capacitor voltage.

The voltage to be evaluated is divided down by the voltage divider R7, R8 in a relationship of 1:10, and rectified by diode D8. The resistor-capacitor unit R9, C8 forms a low-pass filter which, together with the high-pass filter C9, R10, forms a bandpass filter which has a passage range in a frequency window of between about 0.5 Hz to 15 Hz. Those are the variations which are most disturbing to observers of a light source if there are variations in light intensity, for example variations in the discharge arc. The operational amplifier IC2 amplifies the voltage by a factor of 151. The output voltage of the operational amplifier is reduced by a value which is determined by the resistance relationship of the resistors R13, R14 and by the voltage U2, in combination with the resistor R12. Resistors R12, R13, R14 and auxiliary voltage source U2 form a sub-circuit. The auxiliary voltage U3, together with diodes D9, D10 and resistors R15, R16, provide voltage limitation; capacitor C10 provides for noise suppression of the input signal for the input 5 of the microprocessor MC. The amplitude of the input signal is in the range of between 0 and 5 V. The microprocessor or microcontroller MC evaluates this input signal in accordance with its program, under its program control.

During the test phase, the microcontroller MC carries out 40 test measurements for each of the 16 test frequencies, each spaced from each other by 20 ms. If the maximum and minimum of these 40 measured signals at the input 5 of the microcontroller MC deviates by a value in excess of that determined by the program supplied thereto, for example 0.78 V, or if the lamp extinction recognition unit responds, the respective test frequency is evaluated as unsuitable for lamp operation, and in the program a specified bit for that test frequency is set to ONE. Each one of the 40 test measurements, carried out in the 20 ms clock frequency, is done within the maximum of the coupling capacitor harmonic signal of 120 Hz (or 100 Hz) of the coupling capacitor voltage. This also filters the 120 Hz (100 Hz) harmonic content from the measured signal.

The synchronization signal at the NMI input 8 of the microcontroller MC permits synchronization of the 40 measuring time instants within the harmonic signal of 120 Hz (or 100 Hz) derived upon rectification of the power supply from junction J1.

Two 8-bit registers are provided in the microprocessor MC for the 16 test frequencies. The bit associated with the respective test frequency has a zero, if that frequency has flicker-free operation; it is changed to a 1 when acoustic resonance occurs. At the end of the test phase, the program evaluates the contents of these two 8-bit registers.

Modulation of the lamp current, after termination of the test phase, will not be carried out with all test frequencies found as suitable; rather, the program determines a new and possibly larger frequency interval which includes only test frequencies associated with bits of value ZERO at the input. This new frequency window, thus, is defined by the largest number of adjacent flicker-free test frequencies. Frequency modulation of the half-bridge rectifier output voltage, which in effect is that of the lamp current, is then carried out only within the new frequency intervals falling within that now determined frequency window, in discrete frequency steps, with the aforementioned test frequencies after the test phase has terminated.

The sensor unit is not suitable to prevent extinction of the lamp during the test phase, caused by excessive acoustic resonances. This requires a separate lamp extinction recognition circuit XT. The lamp extinction recognition unit or circuit XT is coupled over junction A2 with the coupling capacitor C6 and, essentially, includes the operational amplifier IC3 connected as a comparator. The voltage at the coupling capacitor C6, suitably voltage-divided, is connected to the direct input of the comparator IC3, after having been rectified. This signal includes the intermediate frequency portion of the test frequency and the 120 Hz, or 100 Hz, respectively, harmonic derived from the power supply. The inverting input of the comparator IC3 is supplied to a reference voltage which also has the harmonic of the power supply, 120 Hz, or 100 Hz, respectively, just as the voltage of the coupling capacitor.

If the amplitude of the comparator input signal is higher than the reference voltage applied to the inverting input of comparator IC3, comparator IC3 provides at its output, connected to the input 6 of the microprocessor MC, a high flank; when the reference voltage is passed in downward direction, it provides a low flank. When the lamp extinguishes, the voltage at the coupling capacitor C6 drops below the value of the reference voltage at the inverting input of comparator IC3. When high and low flanks do not appear at the input 6 over several periods of the signal, the microprocessor MC is programmed to evaluate this failure to recognize a lamp which is about to extinguish. The microprocessor MC then switches into the frequency-modulated "normal operation" and, after about 5 seconds, continues the test phase with a different test frequency.

The voltage at coupling capacitor C6 decreases with increasing operating frequency, so it is not possible to operate with the same reference signal at the inverting input of the comparator IC3 for all test frequencies. The reference voltage, therefore, is formed of three components: the first component of the reference voltage is generated by the auxiliary voltage source U3 and voltage divider R17, R19, R20. Signal components available at the terminal A3, and from output 2 of the microprocessor, are added to the first component. From the positive terminal of the intermediate capacitor C3, a 120 Hz, or 100 Hz, respectively, harmonic voltage derived from network rectification is coupled out and connected over junction V5, and over operational amplifier IC4, connected as an amplifier, and capacitor C11 to provide the third component for the reference voltage at the terminal A3. The reference voltage must not be larger than the signal voltage at higher test frequencies, and, therefore, the reference voltage is matched to the signal voltage at about 22 kHz initially. This means that for test frequencies above 22 kHz, the microprocessor MC disconnects the second component generated at its output 2, so that the reference voltage at the inverting input of the comparator IC3 will then be formed by only two components, the third one being zero.

The voltage of the coupling capacitor C6 is provided to the analog input 4 of the microprocessor MC via the voltage divider R5, R6 (see FIG. 2) and junction V4. The microprocessor compares this value, internally, with a reference signal in the course of a repetitively recurring sub-program or micro-program in order to determine if the lamp is operating.

Various changes and modifications may be made. The time periods given are illustrative and originally derived from connection to a power supply network of 50 Hz frequency. Suitable variations of the time periods can be made, with power supply systems of other frequencies (e.g. 60 Hz; 25 Hz), as well known in connection with electrical engineering practice. The number of test frequency steps, likewise, can be varied, 16 being a particularly suitable number because of the presence of 8-bit registers within the microprocessor MC which, however, need not all be utilized.

The circuit of the invention can be implemented in several ways. For example, individual sub-circuits, circuits shown in discrete form or in blocks, or groups of blocks, can be implemented by suitable composite circuits, in particular by integrated circuits. It is also possible to implement many of the functions, and the signal processing of the circuits shown in digital form. At a high level of intregration, it is possible to implement the entire digital signal processing of the circuit by one or more integrated circuits. Signal processing steps, for example filtering, comparing, weighting, which may be linear or non-linear, or timing or counting, can be performed digitally by arithmethic calculations. It is also possible to dispose digital signal processors and other digital circuits, such as shift registers, flip-flops, and the like, within an integrated circuit for the implementation of the overall circuit of the present invention, or sub-circuits thereof.

TABLE I

Characteristics of Microprocessor ST6265
(referred to in the Example)

8 MHz Clock Frequency
Harvard Architecture in the Register Stack
3.8 Kbyte User Programmable ROM
64 byte Data-ROM
128 byte Data-RAM
128 byte EEPROM
21 Programmable I/O-Ports
8 bit-Timer
Autoreload-Timer
Digital-Watchdog
a bit-A/D-Converter
4 Interruptvectors

TABLE II

Dimensional Value of the Electronic Components
of the Example Described (FIGS. 2 and 3)

| | |
|---|---|
| C1 | 10 pF |
| C2 | 150 nF |
| C3 | 22 µF |
| C4 | 470 pF |
| C5 | 1.5 nF |
| C6 | 0.22 µF |
| C7 | 10 nF |
| C8, C10 | 100 nF |
| C9, C11 | 1 µF |
| C12 | 2 µF |
| R1, R7, R9, R19 | 100 KΩ |
| R2 | 4.7 MΩ |
| R4 | 47 Ω |
| R5, R6 | 620 KΩ |
| R8, R14, R15, R16, R17, R23, R24 | 10 KΩ |
| R10 | 392 KΩ |
| R11 | 150 KΩ |
| R12 | 1 KΩ |
| R13 | 56.2 KΩ |
| R18 | 9.8 KΩ |
| R20 | 2.2 KΩ |
| R21 | 121 KΩ |
| R22 | 81.8 KΩ |
| U2, U3, U5 | 5 V |
| IC1 | IR2111 |
| IC2, IC4 | LM324 |
| IC3 | LM393 |
| T2, T3 | IRF840 |
| Q1, Q2 | BC327 |
| D6, D7, D8 | 1N4148 |
| MC | ST6265 by SGS Thomson |

We claim:
1. A method to operate a discharge lamp (LP) subject to acoustic resonances resulting in instabilities of the discharge and hence unstable lamp operation, in which a power supply unit (HS, WR) supplies the lamp with alternating current energy, which is frequency-modulated and in which the frequency excursion due to the modulation varies within a predetermined frequency modulation range, comprising the steps of:
establishing a test phase of limited duration;
determining, based on operation of the lamp during the test phase, those a-c modulation frequencies which are within the predetermined frequency modulation range and which, further, are suitable for, or result in, stable lamp operation; and
after termination of the test phase, operating the lamp only with those a-c frequencies which are suitable for, or to result in, said stable lamp frequency-modulated operation.

2. The method of claim 1, wherein the frequency of the alternating energy is modulated within said frequency range in discrete steps.

3. The method of claim 1, wherein the step of establishing the test phase is controlled by the power supply unit (HS, WR) automatically, and after firing of the discharge lamp;
said power supply unit varying the frequency of the a-c supplied energy within said predetermined frequency modulation range in successive, discrete steps;
wherein said step of determining the frequencies which are suitable for, or result in, stable lamp operation is carried out by said power supply unit; and
wherein said power supply unit (HS, WR) is controlled, after termination of the test phase, to operate the lamp only with a-c frequency energy which has been determined to be suitable for, to result in, stable lamp operation.

4. The method of claim 3, wherein said power supply unit (HS, WR) establishes a frequency window formed by the largest number of a-c modulation frequencies within said range which are continuous and adjacent each other, and suitable for, or result in, said stable lamp operation.

5. For combination with a discharge lamp (LP) subject to acoustic resonances resulting in instabilities of the discharge and hence unstable lamp operation,
a power supply unit (HS, WR) adapted to be coupled to said lamp to supply the lamp with alternating current energy which is frequency-modulated,
carrying out the method as claimed in claim 1,
said power supply unit (HS, WR) comprising:
a programmable microprocessor or microcontroller (MC),
a power supply circuit (WR, LC) connected to the lamp,
said microprocessor or microcontroller (MC), upon energization, establishing a test phase and controlling the power supply unit (WR, LC) to supply the lamp with modulated a-c energy which varies within a predetermined frequency modulation range;
said microprocessor or microcontroller (MC) monitoring an electrical parameter of lamp operation which is characteristic of stable or, respectively, unstable, lamp operation,
said microprocessor determining and storing those a-c frequencies which, in operation of the lamp, result in suitable, or stable, lamp operation and said microprocessor or microcontroller (MC), after the test phase, controlling said power supply circuit that the discharge lamp receives a-c modulated energy which contains only those frequencies which have been determined to be suitable for, or result in, stable lamp operation.

6. The combination of claim 5, wherein the microprocessor or microcontroller (MC) has the following characteristics:
8 MHz clock frequency
Harvard Architecture in the Register Stack
approx. 3.8 Kbyte User Programmable ROM
64 byte Data-ROM
128 byte Data-RAM
128 byte EEPROM
21 Programmable I/O-Ports
8 bit-Timer
Autoreload-Timer
Digital-Watchdog
8 bit-A/D-Convertor
several Interruptvectors.

7. The combination of claim 6, wherein the microprocessor or microcontroller (MC) auto reload—timer output (3) provides pulse width modulation signals for control of the operating frequency of the inverter (WR).

8. The combination of claim 5, wherein the microprocessor or microcontroller (MC) comprises a model ST6265, or a microprocessor or microcontroller having technical characteristics provided by said ST6265.

9. The combination of claim 5, wherein the power supply circuit comprises an inverter (WR), and an inductance-capacitance output circuit (RK) to which the discharge lamp (LP) is connected.

10. The combination of claim 9, wherein the inverter (WR) is a controlled half-bridge inverter (WR), and defining a center terminal (M) between halves of the half-bridge;
the inductance-capacitance (LC) output circuit (RK) being connected to the center terminal (M) of the half-bridge inverter (WR), and comprising a resonant circuit having a resonance inductance (L2), a resonance capacitor (C5) and a coupling capacitor (C6), all connected to the discharge lamp (LP);
wherein the microprocessor or microcontroller (MC) is connected to monitor the voltage drop across the coupling capacitor (C6) at least during the test phase; and
wherein the microprocessor or microcontroller (MC) generates the control signals controlling the half-bridge inverter (WR).

11. The combination of claim 10, further including a lamp extinction recognition sub-circuit (MC terminal 3, IC1) which is connected to the lamp (LP) to inhibit extinction of the lamp during the test phase.

12. The combination of claim 11, wherein the sensing sub-circuit (SC) detects low-frequency variations of the voltage across the coupling capacitor (C6) and conducts signals representative of said low-frequency variations to the microprocessor or microcontroller (MC).

13. The combination of claim 10, further including a sensing sub-circuit (C6, A1, V3, SC) to sense disturbed operation of the discharge arc within the discharge lamp.

14. The combination of claim 13, wherein the sensing sub-circuit comprises a band-pass filter (R9, C8; C9, R10) which has a preferred band-pass window in the frequency range of between about 0.5 Hz and 15.0 Hz.

15. The combination of claim 10, including a lamp extinction recognition sub-circuit (XT) which comprises
a comparator (IC3) comparing, at least during the test phase, the voltage drop across the coupling capacitor (C6) with a reference value, said sub-circuit providing an output signal connected to the microprocessor or microcontroller (MC) for evaluation of the characteristics thereof.

16. The combination of claim 10, further including an integrated circuit (IC1) connected to control the half-bridge inverter (WR), said integrated circuit, in turn, receiving input control signals from said microprocessor or microcontroller (MC).

17. A lighting system comprising
a high-pressure discharge lamp (LP) subject to acoustic resonances resulting in instabilities of the discharge and hence unstable lamp operation, and
a power supply unit connected to and controlling operation of the discharge lamp,
said power supply unit including
a programmable microprocessor or microcontroller (MC); and
a controlled power supply circuit having a controlled frequency-variable frequency generator (WR), connected to and being frequency-controlled by said microprocessor or microcontroller (MC); and wherein the microprocessor or microcontroller (MC) controls the power supply circuit to provide alternating current operating energy which is frequency-modulated within a predetermined frequency modulation range;

means are provided to determine, during operation of the lamp, at any one of the modulations of the frequency-modulated energy supplied, the conditions of operation of the lamp, and whether the arc discharge is stable or quiet, or unstable or disturbed, said microprocessor or microcontroller, during a test phase, storing those frequencies which are suitable for, or result in, stable or quiet operation of the lamp; and after termination of the test phase, said microprocessor or microcontroller controlling the power supply circuit to supply the lamp only with those frequencies which are suitable for, or result in, said stable operation of the lamp.

18. The system of claim 17, wherein said microprocessor or microcontroller (MC) establishes, and stores, a window of frequencies formed by the largest number of contiguous modulation frequencies which are suitable for, or result in, said stable or quiet lamp operation; and wherein said microprocessor or microcontroller (MC) then controls the power supply circuit to furnish power to the lamp only with frequencies within said so established window.

19. The system of claim 17, wherein the power supply circuits includes a bridge-type inverter (WR) defining a center terminal (M) between branches of the bridge inverter;

an inductance-capacitance (LC) output circuit (RK) being connected to the center terminal (M) of the inverter (WR), and comprising a resonant circuit having a resonance inductance (L2), a resonance capacitor (C5) and a coupling capacitor (C6), all connected to the discharge lamp (LP);

wherein the microprocessor or microcontroller (MC) is connected to monitor the voltage drop across the coupling capacitor (C6) at least during the test phase; and wherein the microprocessor or microcontroller generates control signals controlling said inverter (WR).

20. The system of claim 19, further including a sensing subcircuit (C6, A1, V3, SC) to sense disturbed operation of the discharge arc within the discharge lamp, said sensing subcircuit comprising a band-pass filter (R9, C8; C9, R10) which has a preferred band-pass window in the frequency range of between about 0.5 Hz and 15 Hz.

* * * * *

UNITED STATES PATENT AND TRADEMARK OFFICE
CERTIFICATE OF CORRECTION

PATENT NO. : 5,680,015
DATED : October 21, 1997
INVENTOR(S) : BERNITZ et al.

It is certified that error appears in the above-identified patent and that said Letters Patent is hereby corrected as shown below:

Title page, Item [54] Title, and col. 1,
    change "LAMP, AND CIRCUIT ARRANGEMENT FOR OPERATION OF THE DISCHARGE LAMP" to --LAMP SUBJECT TO UNSTABLE OPERATION UPON OCCURRENCE OF ACOUSTIC RESONANCES, AND OPERATING CIRCUIT FOR THE DISCHARGE LAMP--;

Column 13, line 16 (claim 3, line 13), after "for," insert --or--.

Signed and Sealed this

Sixteenth Day of November, 1999

Attest:

Attesting Officer

Q. TODD DICKINSON

Acting Commissioner of Patents and Trademarks